US012785563B2

(12) United States Patent
Chen

(10) Patent No.: US 12,785,563 B2
(45) Date of Patent: Nov. 3, 2026

(54) POWER CONVERTER HAVING VOLTAGE DIFFERENCE CONTROL MECHANISM

(71) Applicant: ANPEC ELECTRONICS CORPORATION, Hsinchu (TW)

(72) Inventor: Kun-Min Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 169 days.

(21) Appl. No.: 19/016,021

(22) Filed: Jan. 10, 2025

(65) Prior Publication Data

US 2026/0155745 A1 Jun. 4, 2026

(30) Foreign Application Priority Data

Nov. 29, 2024 (TW) ................................ 113146183

(51) Int. Cl.
*H02M 3/158* (2006.01)
*H02M 1/00* (2007.01)
*H02M 1/08* (2006.01)

(52) U.S. Cl.
CPC ......... *H02M 3/158* (2013.01); *H02M 1/0016* (2021.05); *H02M 1/08* (2013.01)

(58) Field of Classification Search
CPC ............... H02M 3/158; H02M 1/0016; H02M 3/33571; H02M 1/08–096; H02M 7/5387
See application file for complete search history.

(56) References Cited

U.S. PATENT DOCUMENTS

| | | | | |
|---|---|---|---|---|
| 7,518,352 | B2 | 4/2009 | De Lima Filho | |
| 9,774,322 | B1 * | 9/2017 | Duduman | H03K 17/223 |
| 10,511,303 | B2 * | 12/2019 | Duduman | H03K 17/223 |
| 11,342,911 | B2 * | 5/2022 | Lee | H03K 17/06 |
| 12,368,374 | B2 * | 7/2025 | Raffo | G01R 31/2621 |
| 12,609,692 | B2 * | 4/2026 | Ko | H03K 17/063 |
| 2013/0038307 | A1 * | 2/2013 | Saito | H02M 3/335 323/283 |
| 2024/0072654 | A1 * | 2/2024 | Chen | H03K 17/063 |
| 2024/0333284 | A1 * | 10/2024 | Yasuji | H03K 17/063 |

* cited by examiner

*Primary Examiner* — Crystal L Hammond
*Assistant Examiner* — Nicolas Alden Chapa Mills
(74) *Attorney, Agent, or Firm* — Li & Cai Intellectual Property (USA) Office

(57) ABSTRACT

A power converter having a voltage difference control mechanism includes a high-side switch, a low-side switch, a high-side off-state driver circuit, a high-side on-state driver circuit, a high-side off-state driver circuit and a high-side voltage difference modulating circuit. The high-side on-state driver circuit switches the high-side switch from an off-state to an on-state. The high-side voltage difference modulating circuit outputs a floating voltage to a first power input terminal of the high-side off-state driver circuit according to an output voltage of the output node. The high-side off-state driver circuit uses the floating voltage to switch the high-side switch from the on-state to the off-state such that a voltage difference between the floating voltage and the output voltage falls within a target voltage range.

20 Claims, 9 Drawing Sheets

POWER CONVERTER HAVING VOLTAGE DIFFERENCE CONTROL MECHANISM

CROSS-REFERENCE TO RELATED PATENT APPLICATION

This application claims the benefit of priority to Taiwan Patent Application No. 113146183, filed on Nov. 29, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter having a voltage difference control mechanism.

BACKGROUND OF THE DISCLOSURE

Power converters are indispensable for electronic devices, and are used for adjusting power and supplying the adjusted power to the electronic devices. A high-side switch and a low-side switch of the power converter must be switched according to voltages or currents of circuit components in the power converter, such that the power converter supplies appropriate power to a load. However, circuit components configured to control the high-side switch occupy a large area in the conventional power converters and cannot accurately control operation of the high-side switch.

SUMMARY OF THE DISCLOSURE

In response to the above-referenced technical inadequacies, the present disclosure provides a power converter having a voltage difference control mechanism. The power converter includes a high-side switch, a low-side switch, a low-side driver circuit, a high-side on-state driver circuit, a high-side off-state driver circuit and a high-side voltage difference modulating circuit. A first terminal of the high-side switch is coupled to an input voltage. A first terminal of the low-side switch is connected to a second terminal of the high-side switch. A second terminal of the low-side switch is grounded. The low-side driver circuit is connected to a control terminal of the low-side switch and configured to drive the low-side switch. The high-side on-state driver circuit is configured to switch the high-side switch from an off-state to an on-state. A signal output terminal of the high-side off-state driver circuit is connected to a control terminal of the high-side switch. The high-side voltage difference modulating circuit is connected to a first power input terminal of the high-side off-state driver circuit. The high-side voltage difference modulating circuit is connected to an output node between the first terminal of the low-side switch and the second terminal of the high-side switch. The high-side voltage difference modulating circuit is configured to output a floating voltage to the first power input terminal of the high-side off-state driver circuit according to an output voltage of the output node. The high-side off-state driver circuit is configured to use the floating voltage to switch the high-side switch from the on-state to the off-state such that a voltage difference between the floating voltage and the output voltage falls within a target voltage range.

As described above, the present disclosure provides the power converter having the voltage difference control mechanism. In comparison with a conventional power converter including a voltage level adjusting circuit occupying a large area therein, the power converter of the present disclosure includes the high-side voltage difference modulating circuit. Even if the voltage level adjusting circuit is omitted in the power converter of the present disclosure, the high-side voltage difference modulating circuit of the power converter of the present disclosure modulates the floating voltage of the positive power input terminal of the high-side off-state driver circuit for precise control of the high-side switch. Therefore, size and power consumption of the power converter of the present disclosure are smaller than that of the conventional power converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
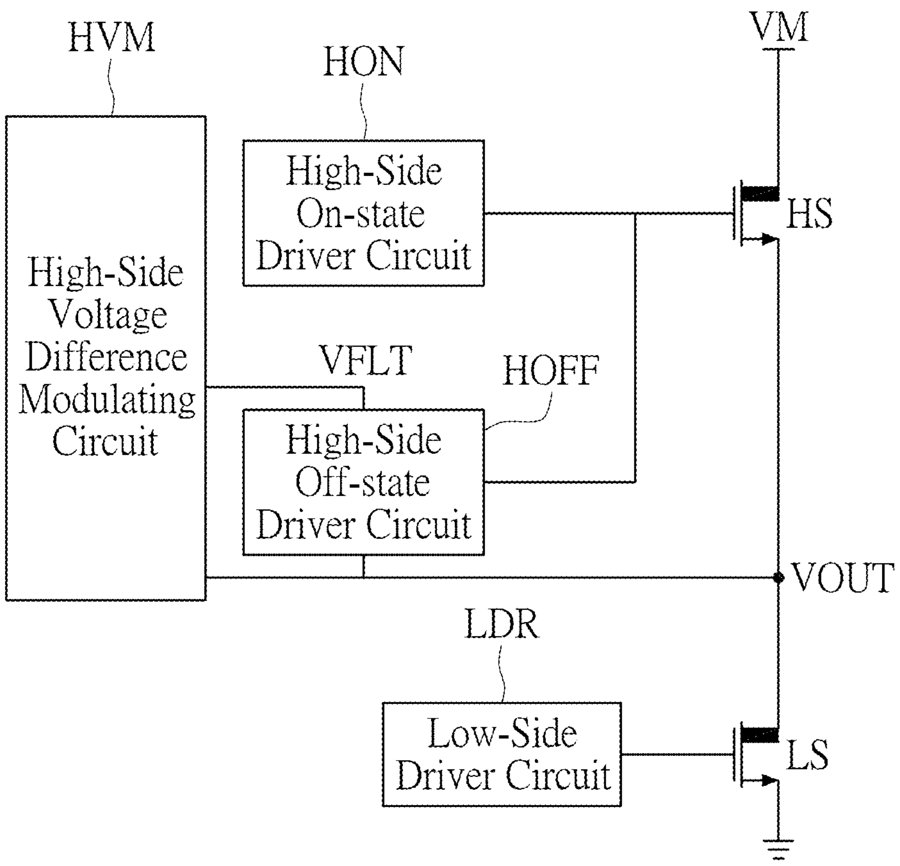
FIG. 1 is a circuit diagram of a power converter having a voltage difference control mechanism according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a power converter having a voltage difference control mechanism according to a first embodiment of the present disclosure.

The power converter of the present disclosure includes a high-side switch HS, a low-side switch LS, a high-side on-state driver circuit HON, a high-side off-state driver circuit HOFF, a low-side driver circuit LDR and a high-side voltage difference modulating circuit HVM.

A first terminal of the high-side switch HS is coupled to an input voltage VM. A second terminal of the high-side switch HS is connected to a first terminal of the low-side switch LS. A second terminal of the low-side switch LS is grounded. The low-side driver circuit LDR is connected to a control terminal of the low-side switch LS.

An output node between the second terminal of the high-side switch HS and the first terminal of the low-side switch LS is used as an output terminal of the power converter of the present disclosure and is configured to supply an output voltage VOUT.

The high-side on-state driver circuit HON is a circuit configured to turn on the high-side switch HS. That is, the high-side on-state driver circuit HON is configured to switch the high-side switch HS from an off-state to an on-state.

The high-side off-state driver circuit HOFF is a circuit configured to turn off the high-side switch HS. That is, the off-state driver circuit HOFF is configured to switch the high-side switch HS from the on-state to the off-state.

The low-side driver circuit LDR is configured to drive the low-side switch LS.

It is worth noting that, the power converter of the present disclosure includes the high-side voltage difference modulating circuit HVM. An input terminal of the high-side voltage difference modulating circuit HVM is connected to an output node between the second terminal of the high-side switch HS and the first terminal of the low-side switch LS, and receives the output voltage VOUT from the output node. An output terminal of the high-side voltage difference modulating circuit HVM is connected to a first power input terminal (such as a positive power input terminal) of the high-side off-state driver circuit HOFF. A signal output terminal of the high-side off-state driver circuit HOFF is connected to a control terminal of the high-side switch HS.

The high-side voltage difference modulating circuit HVM, according to the output voltage VOUT of the output node between the second terminal of the high-side switch HS and the first terminal of the low-side switch LS, sets or modulates a floating voltage VFLT and outputs the floating voltage VFLT that is set or modulated to the first power input terminal (such as the positive power input terminal) of the high-side off-state driver circuit HOFF.

If necessary, a second power terminal (such as a negative power input terminal) of the high-side off-state driver circuit HOFF may be connected to the output node between the second terminal of the high-side switch HS and the first terminal of the low-side switch LS, and receives the output voltage VOUT from the output node.

The high-side off-state driver circuit HOFF may use a floating voltage VFLT received by the first power input terminal such as the positive power input terminal of the high-side off-state driver circuit HOFF (and the output voltage VOUT received by a second power input terminal such as a negative power input terminal of the high-side off-state driver circuit HOFF) to switch the high-side switch HS from the on-state to the off-state.

A voltage of the first power input terminal (such as the positive power input terminal) of the high-side off-state driver circuit HOFF is changed with a change in the output voltage VOUT of the output node between the second terminal of the high-side switch HS and the first terminal of the low-side switch LS. As described herein, a voltage of the first power input terminal (such as the positive power input terminal) of the high-side off-state driver circuit HOFF is the floating voltage VFLT.

It is worth noting that, the high-side voltage difference modulating circuit HVM precisely controls a voltage difference between the floating voltage VFLT received by the first power input terminal (such as the positive power input terminal) of the high-side off-state driver circuit HOFF and the output voltage VOUT of the output node to fall within a target voltage range. The output node is a node between the second terminal of the high-side switch HS and the first terminal of the low-side switch LS. In particular, the high-side voltage difference modulating circuit HVM is able to control the voltage difference to fall within a low voltage small range. The high-side voltage difference modulating circuit HVM is able to control the voltage difference between the floating voltage VFLT and the output voltage VOUT to be maintained to be equal to a target voltage difference or to be maintained to be smaller than a voltage threshold.

In contrast, a value of a supply voltage received by a first power input terminal of a high-side off-state driver circuit of a conventional power converter is a constant voltage value. As a result, the conventional power converter cannot control a voltage difference between the supply voltage received by the first power input terminal of high-side off-state driver circuit of the conventional power converter and an output voltage of an output terminal of the conventional power converter to fall within a target voltage range. In particular, the conventional power converter cannot precisely control the voltage difference to fall within a low voltage small range.

In comparison with the conventional power converter, the power converter of the present disclosure further includes the high-side voltage difference modulating circuit HVM. The high-side voltage difference modulating circuit HVM is configured to, according to the output voltage VOUT of the power converter of the present disclosure, modulate and control the voltage received by the first power input terminal of the high-side off-state driver circuit HOFF for modulating and controlling a state of the high-side switch HS driven by the high-side off-state driver circuit HOFF. As a result, the power converter of the present disclosure is capable of precisely supplying a suitable amount of power to a load connected thereto.

Figure 2:
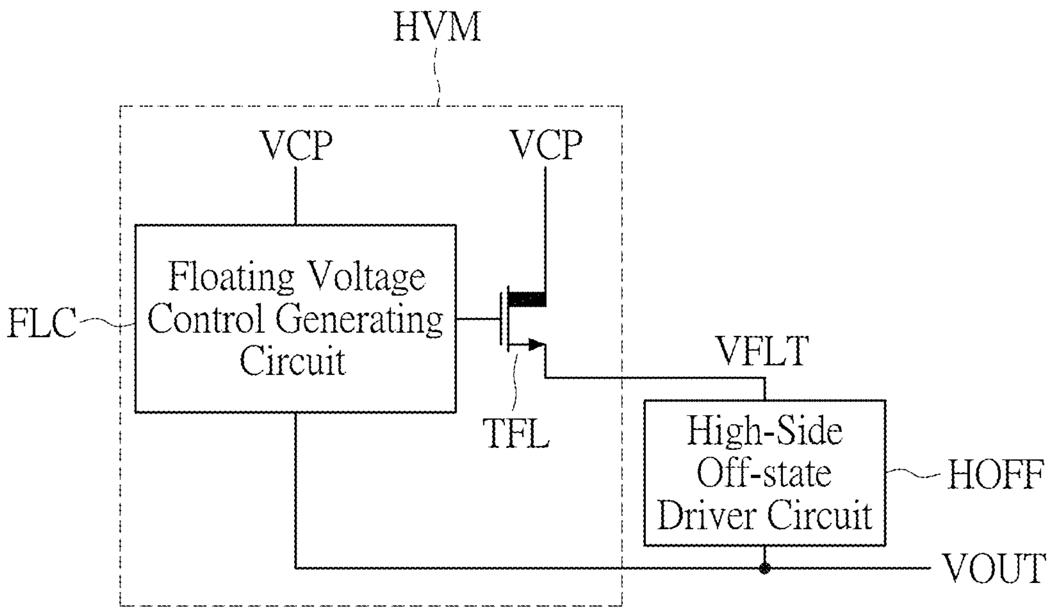
FIG. 2 is a circuit diagram of a high-side voltage difference modulating circuit of a power converter having a voltage difference control mechanism according to a second embodiment of the present disclosure.

Reference is made to FIG. 2, which is a circuit diagram of a high-side voltage difference modulating circuit of a power converter having a voltage difference control mechanism according to a second embodiment of the present disclosure.

The high-side voltage difference modulating circuit HVM may include a floating voltage supplying transistor TFL and a floating voltage control generating circuit FLC. The floating voltage supplying transistor TFL may be any type of transistor.

A voltage input terminal of the floating voltage control generating circuit FLC is connected to the output node between the second terminal of the high-side switch HS and the first terminal of the low-side switch LS.

A first terminal (such as a drain terminal) of the floating voltage supplying transistor TFL is coupled to a charging voltage VCP. A second terminal (such as a source terminal) of the floating voltage supplying transistor TFL is coupled to the first power input terminal (such as the positive power input terminal) of the high-side off-state driver circuit HOFF. A control terminal (such as a gain terminal) of the floating voltage supplying transistor TFL is connected to a signal output terminal of the floating voltage control generating circuit FLC.

The floating voltage control generating circuit FLC may be coupled to the charging voltage VCP to obtain power from the charging voltage VCP for operation.

It is worth noting that, the floating voltage control generating circuit FLC, according to the output voltage VOUT of the output node between the second terminal of the high-side switch HS and the first terminal of the low-side switch LS, outputs a floating control voltage signal to a control terminal of the floating voltage supplying transistor TFL for controlling the floating voltage supplying transistor TFL so as to control a value of the floating voltage VFLT. The floating voltage VFLT is supplied from the second terminal of the floating voltage supplying transistor TFL to the first power input terminal (such as the positive power input terminal) of the high-side off-state driver circuit HOFF.

Figure 3:
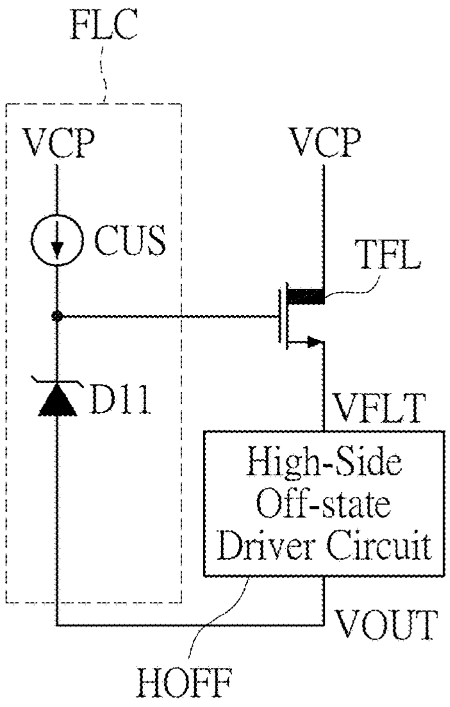
FIG. 3 is a circuit diagram of a high-side voltage difference modulating circuit of a power converter having a voltage difference control mechanism according to a third embodiment of the present disclosure.

Reference is made to FIG. 3, which is a circuit diagram of a high-side voltage difference modulating circuit of a power converter having a voltage difference control mechanism according to a third embodiment of the present disclosure.

The high-side voltage difference modulating circuit HVM shown in FIG. 1 may include the floating voltage control generating circuit FLC and the floating voltage supplying transistor TFL as shown in FIG. 3. As shown in FIG. 3, the floating voltage control generating circuit FLC may include a current source CUS and a control-side diode circuit. The control-side diode circuit may include a diode as a control-side diode D11 shown in FIG. 3, or in practice, include a plurality of diodes. For example, the control-side diode D11 may be a Zener diode shown in FIG. 3, or in practice, may be another type of diode.

The control-side diode circuit is connected between the current source CUS and the output node. The output node is the node between the second terminal of the high-side switch HS and the first terminal of the low-side switch LS.

An input terminal of the current source CUS is coupled to the charging voltage VCP. A first terminal such as an anode of the control-side diode D11 is connected to the output node between the second terminal of the high-side switch HS and the first terminal of the low-side switch LS. A second terminal such as a cathode of the control-side diode D11 is connected to an output terminal of the current source CUS and the control terminal of the floating voltage supplying transistor TFL.

Figure 4:
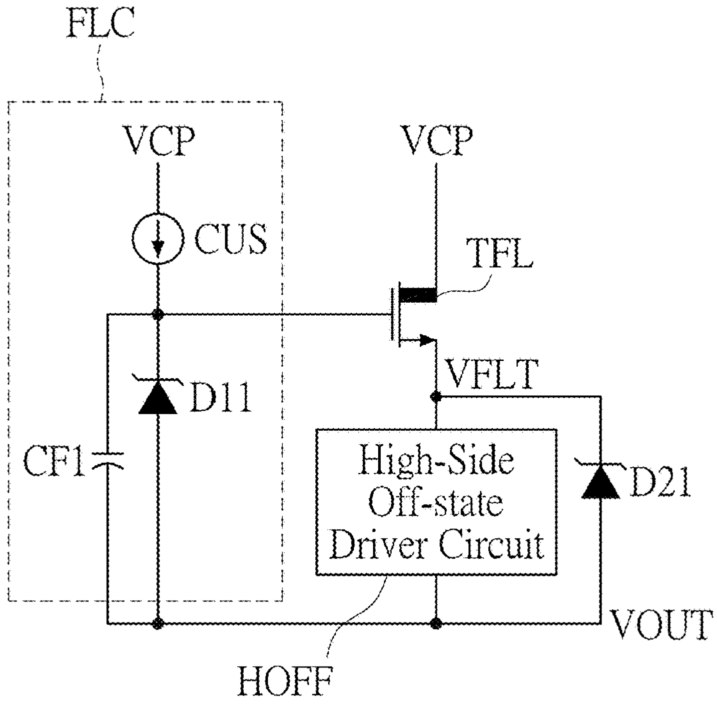
FIG. 4 is a circuit diagram of a high-side voltage difference modulating circuit of a power converter having a voltage difference control mechanism according to a fourth embodiment of the present disclosure.

Reference is made to FIG. 4, which is a circuit diagram of a high-side voltage difference modulating circuit of a power converter having a voltage difference control mechanism according to a fourth embodiment of the present disclosure.

The high-side voltage difference modulating circuit HVM shown in FIG. 1 not only includes the floating voltage supplying transistor TFL and the floating voltage control generating circuit FLC as shown in FIG. 4, but also includes an output-side diode circuit. The output-side diode circuit includes a diode as an output-side diode D21 shown in FIG. 4, or in particular, includes a plurality of diodes.

As shown in FIG. 4, the floating voltage control generating circuit FLC not only includes the current source CUS and the control-side diode D11, but also includes a voltage stabilizing capacitor CF1.

As shown in FIG. 4, a first terminal of the voltage stabilizing capacitor CF1 is connected to the output terminal of the current source CUS and the control terminal of the floating voltage supplying transistor TFL. A second terminal of the voltage stabilizing capacitor CF1 shown in FIG. 4 is connected to the output node between the second terminal of the high-side switch HS and the first terminal of the low-side switch LS as shown in FIG. 1.

A current path is formed on a wire that is connected between the output-side diode D21, the floating voltage supplying transistor TFL and the high-side off-state driver circuit HOFF. A current flows through the output-side diode D21, the floating voltage supplying transistor TFL and the high-side off-state driver circuit HOFF along the current path. The floating voltage VFLT of the first power input terminal (such as the positive power input terminal) of the high-side off-state driver circuit HOFF is clamped at the target voltage value by the output-side diode D21, in particular, when the output voltage VOUT of the output node between the second terminal of the high-side switch HS and the first terminal of the low-side switch LS is reduced.

The voltage stabilizing capacitor CF1 is configured to stabilize a voltage of the control terminal of the floating voltage supplying transistor TFL, in particular, when a transient change occurs in the output voltage VOUT of the output node between the second terminal of the high-side switch HS and the first terminal of the low-side switch LS.

Figure 5:
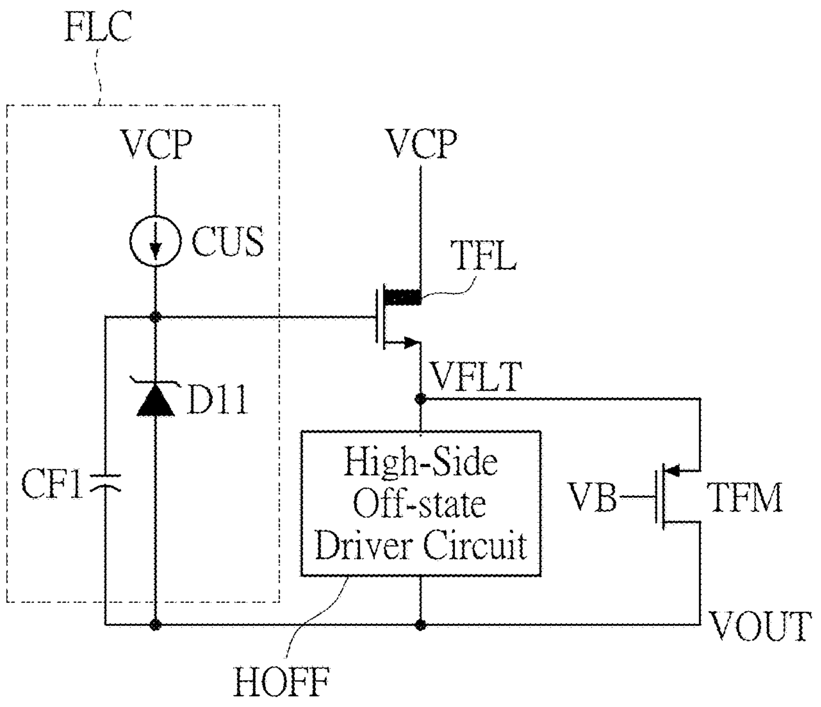
FIG. 5 is a circuit diagram of a high-side voltage difference modulating circuit of a power converter having a voltage difference control mechanism according to a fifth embodiment of the present disclosure.

Reference is made to FIG. 5, which is a circuit diagram of a high-side voltage difference modulating circuit of a power converter having a voltage difference control mechanism according to a fifth embodiment of the present disclosure.

The descriptions of the fifth embodiment of the present disclosure that are the same as the descriptions of the fourth embodiment are not repeated herein. A difference between the fourth and fourth embodiments of the present disclosure is that, the power converter of the fourth embodiment of the present disclosure includes the output-side diode D21 shown in FIG. 4, but the power converter of the fifth embodiment of the present disclosure includes an output-side transistor circuit and the output-side transistor circuit includes a transistor as an output-side transistor TFM shown in FIG. 5.

A first terminal (such as a drain terminal) of the output-side transistor TFM is connected to the second power input terminal (such as the negative power input terminal) of the high-side off-state driver circuit HOFF. A second terminal (such as a source terminal) of the output-side transistor TFM is connected to the second terminal of the floating voltage supplying transistor TFL. A control terminal (such as a gain terminal) of the output-side transistor TFM is coupled to a control voltage VB.

A current path is formed on a wire that is connected to the output-side transistor TFM, the floating voltage supplying transistor TFL and the high-side off-state driver circuit HOFF. A current flows through the output-side transistor TFM, the floating voltage supplying transistor TFL and the high-side off-state driver circuit HOFF along the current path. As a result, the floating voltage VFLT of the first power input terminal (such as the positive power input terminal) of the high-side off-state driver circuit HOFF is modulated, for example, is reduced. Therefore, the floating voltage VFLT of the first power input terminal (such as the positive power input terminal) of the high-side off-state driver circuit HOFF is controlled to reach the target voltage value by the output-side transistor TFM.

Figure 6:
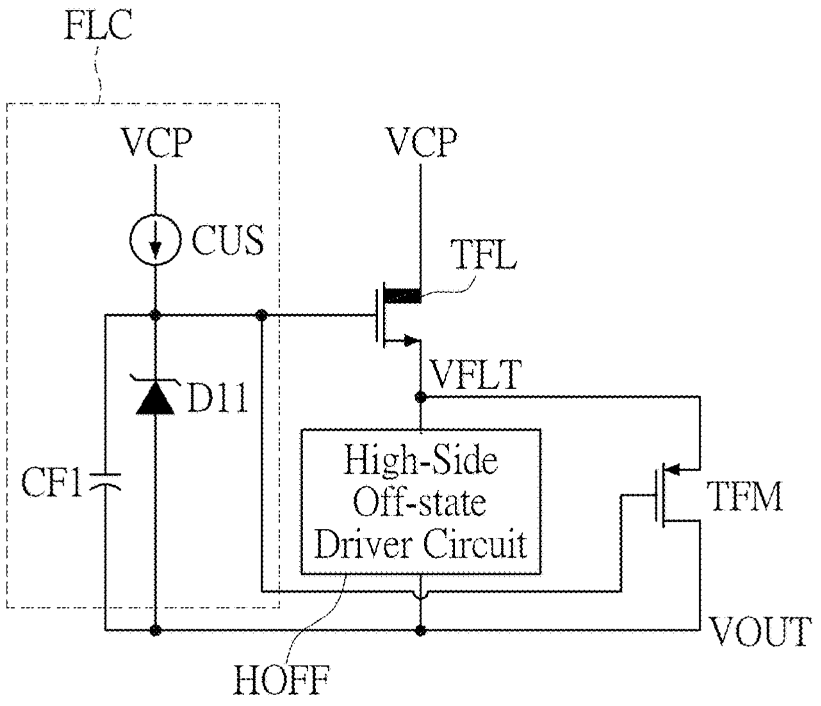
FIG. 6 is a circuit diagram of a high-side voltage difference modulating circuit of a power converter having a voltage difference control mechanism according to a sixth embodiment of the present disclosure.

Reference is made to FIG. 6, which is a circuit diagram of a high-side voltage difference modulating circuit of a power converter having a voltage difference control mechanism according to a sixth embodiment of the present disclosure.

The descriptions of the sixth embodiment that are the same as the descriptions of the fifth embodiments of the present disclosure are not repeated herein. A difference between the sixth and fifth embodiments of the present disclosure is a configuration of the control terminal of the output-side transistor TFM, which is specifically described as follows.

As shown in FIG. 5, the control terminal of the output-side transistor TFM is coupled to the control voltage VB. In contrast, as shown in FIG. 6, the control terminal of the output-side transistor TFM and the control terminal of the floating voltage supplying transistor TFL are connected to the cathode of the control-side diode D11 and the first terminal of the voltage stabilizing capacitor CF1.

Figure 7:
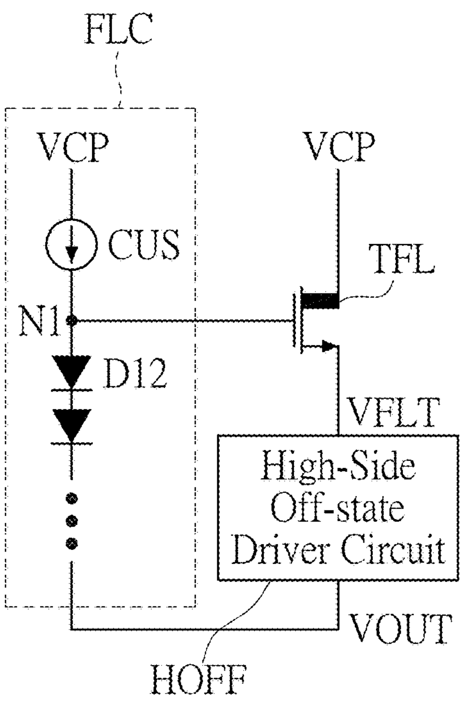
FIG. 7 is a circuit diagram of a high-side voltage difference modulating circuit of a power converter having a voltage difference control mechanism according to a seventh embodiment of the present disclosure.

Reference is made to FIG. 7, which is a circuit diagram of a high-side voltage difference modulating circuit of a power converter having a voltage difference control mechanism according to a seventh embodiment of the present disclosure.

As shown in FIG. 3, in the third embodiment, the control-side diode circuit of the floating voltage control generating circuit FLC only includes the control-side diode D11. In contrast, as shown in FIG. 7, in the seventh embodiment, the control-side diode circuit of the floating voltage control generating circuit FLC includes a plurality of diodes as a plurality of control-side diodes D12.

As shown in FIG. 7, the plurality of control-side diodes D12 are sequentially arranged and connected with each other in series. A second terminal such as a cathode of a last one of the plurality of control-side diodes D12 shown in FIG. 7 is connected to the output node between the second terminal of the high-side switch HS and the first terminal of the low-side switch LS as shown in FIG. 1, and receives the output voltage VOUT from the output node.

As shown in FIG. 7, a first terminal such as an anode of each of the plurality of control-side diodes D12, except for a first one of the plurality of control-side diodes D12, is connected to the second terminal such as the cathode of a previous one of the plurality of control-side diodes D12. The first terminal such as the anode of the first one of the plurality of control-side diodes D12 is connected to a control node N1. The control node N1 is connected to the output terminal of the current source CUS and the control terminal of the floating voltage supplying transistor TFL.

Figure 8:
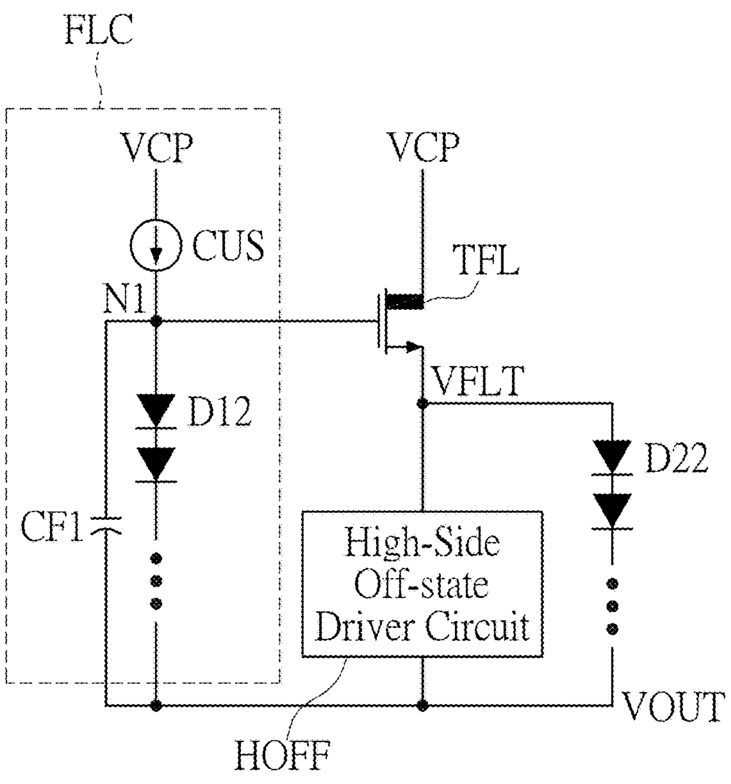
FIG. 8 is a circuit diagram of a high-side voltage difference modulating circuit of a power converter having a voltage difference control mechanism according to an eighth embodiment of the present disclosure.

Reference is made to FIG. 8, which is a circuit diagram of a high-side voltage difference modulating circuit of a power converter having a voltage difference control mechanism according to an eighth embodiment of the present disclosure.

The high-side voltage difference modulating circuit HVM shown in FIG. 1 may include the floating voltage control generating circuit FLC and the floating voltage supplying transistor TFL as shown in FIG. 8.

As shown in FIG. 8, the high-side voltage difference modulating circuit HVM not only includes the floating voltage control generating circuit FLC, but also includes an output-side diode circuit. The output-side diode circuit may include a plurality of output-side diodes D22 that are sequentially arranged and connected with each other in series.

The first terminal such as the anode of the first one of the plurality of output-side diodes D22 is connected to the second terminal of the floating voltage supplying transistor TFL and the first power input terminal (such as the positive power input terminal) of the high-side off-state driver circuit HOFF. The first terminal such as the anode of the plurality of output-side diodes D22, except for the first one of the plurality of output-side diodes D22, is connected to the second terminal such as the cathode of a previous one of the plurality of output-side diodes D22. The second terminal such as the cathode of the last one of the plurality of output-side diodes D22 is connected to the second power terminal (such as the negative power input terminal) of the high-side off-state driver circuit HOFF.

The floating voltage control generating circuit FLC may include the current source CUS, the control-side diode circuit (including the plurality of control-side diodes D12) and the voltage stabilizing capacitor CF1.

As shown in FIG. 8, the first terminal of the voltage stabilizing capacitor CF1 is connected to the control node N1. The second terminal of the voltage stabilizing capacitor CF1 shown in FIG. 8 is connected to the output node between the second terminal of the high-side switch HS and the first terminal of the low-side switch LS as shown in FIG. 1, and receives the output voltage VOUT from the output node.

The configurations of the plurality of control-side diodes D12 shown in FIG. 8 are the same as that shown in FIG. 7, the same descriptions of which are not repeated herein.

Figure 9:
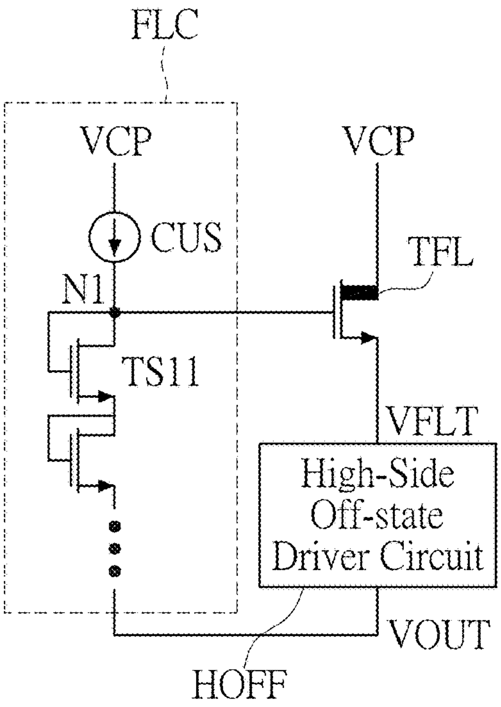
FIG. 9 is a circuit diagram of a high-side voltage difference modulating circuit of a power converter having a voltage difference control mechanism according to a ninth embodiment of the present disclosure.

Reference is made to FIG. 9, which is a circuit diagram of a high-side voltage difference modulating circuit of a power converter having a voltage difference control mechanism according to a ninth embodiment of the present disclosure.

The high-side voltage difference modulating circuit HVM shown in FIG. 1 may include the floating voltage control generating circuit FLC and the floating voltage supplying transistor TFL as shown in FIG. 9. As shown in FIG. 9, the floating voltage control generating circuit FLC may include the current source CUS and a control-side transistor circuit, wherein the control-side transistor circuit may include a plurality of transistors as a plurality of control-side transistors TS11.

The input terminal of the current source CUS is coupled to the charging voltage VCP. The plurality of control-side transistors TS11 are sequentially arranged. A control terminal (such as a gain terminal) and a first terminal (such as a drain terminal) of a first one of the plurality of control-side transistors TS11 are connected to the output terminal of the current source CUS. A control terminal and a first terminal of each of the plurality of control-side transistors TS11, except for the first one of the plurality of control-side transistors TS11, are connected to the second terminal of a previous one of the plurality of control-side transistors TS11. A second terminal (such as a source terminal) of a last one of the plurality of control-side transistors TS11 shown in FIG. 9 is connected to the output node between the second terminal of the high-side switch HS and the first terminal of the low-side switch LS as shown in FIG. 1, and receives the output voltage VOUT from the output node.

Figure 10:
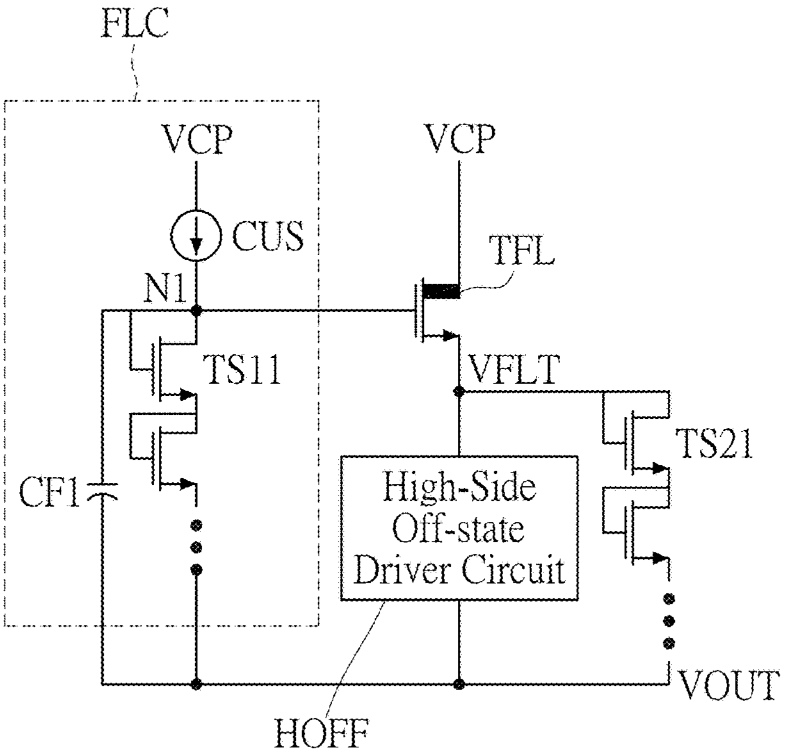
FIG. 10 is a circuit diagram of a high-side voltage difference modulating circuit of a power converter having a voltage difference control mechanism according to a tenth embodiment of the present disclosure.

Reference is made to FIG. 10, which is a circuit diagram of a high-side voltage difference modulating circuit of a power converter having a voltage difference control mechanism according to a tenth embodiment of the present disclosure.

The high-side voltage difference modulating circuit HVM shown in FIG. 1 may not only include the floating voltage control generating circuit FLC and the floating voltage supplying transistor TFL shown in FIG. 10, but also include an output-side transistor circuit. The output-side transistor circuit includes a plurality of output-side transistors TS21 shown in FIG. 10, or in practice, only includes one of the plurality of output-side transistors TS21.

As shown in FIG. 10, the plurality of output-side transistors TS21 are sequentially arranged. A first terminal (such as a drain terminal) and a control terminal (such as a gate terminal) of a first one of the plurality of output-side transistors TS21 are connected to the second terminal (such as the source terminal) of the floating voltage supplying transistor TFL. A first terminal (such as a drain terminal) and a control terminal (such as a gain terminal) of each of the plurality of output-side transistors TS21, except for the first one of the plurality of output-side transistors TS21, are connected to a second terminal (such as a source terminal) of a previous one of the plurality of output-side transistors TS21. A second terminal of a last one of the plurality of output-side transistors TS21 is connected to the second power terminal (such as the negative power input terminal) of the high-side off-state driver circuit HOFF.

A current path is formed on a wire that is connected between the plurality of output-side transistors TS21, the floating voltage supplying transistor TFL and the high-side off-state driver circuit HOFF. A current flows through the plurality of output-side transistors TS21, the floating voltage supplying transistor TFL and the high-side off-state driver circuit HOFF along the current path. As a result, the floating voltage VFLT of the first power input terminal (such as the positive power input terminal) of the high-side off-state driver circuit HOFF is modulated and controlled, for example, is reduced, to reach the target voltage value.

The floating voltage control generating circuit FLC may include the current source CUS, the voltage stabilizing capacitor CF1 and the control-side transistor circuit. The control-side transistor circuit includes the plurality of control-side transistors TS11. The configurations of the plurality of control-side transistors TS11 shown in FIG. 10 are the same as that shown in FIG. 9, the same descriptions of which are not repeated herein.

As shown in FIG. 10, the first terminal of the voltage stabilizing capacitor CF1 is connected to the control node N1. The second terminal of the voltage stabilizing capacitor CF1 shown in FIG. 10 is connected to the output node between the second terminal of the high-side switch HS and the first terminal of the low-side switch LS as shown in FIG. 1, and receives the output voltage VOUT from the output node.

Figure 11:
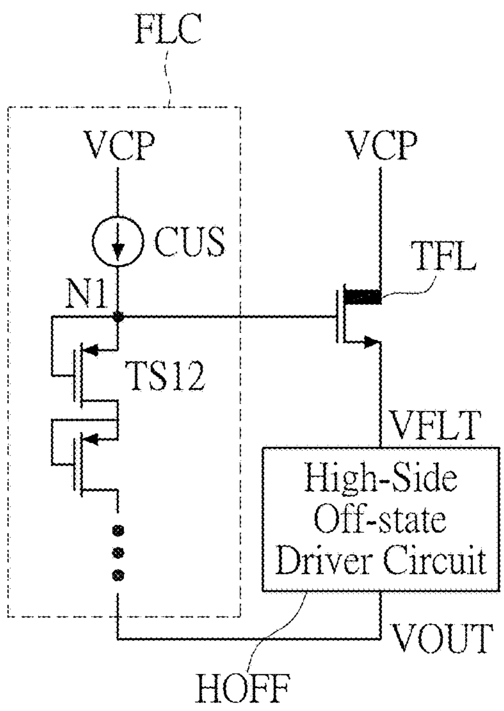
FIG. 11 is a circuit diagram of a high-side voltage difference modulating circuit of a power converter having a voltage difference control mechanism according to an eleventh embodiment of the present disclosure.

Reference is made to FIG. 11, which is a circuit diagram of a high-side voltage difference modulating circuit of a power converter having a voltage difference control mechanism according to an eleventh embodiment of the present disclosure.

The high-side voltage difference modulating circuit HVM shown in FIG. 1 may include the floating voltage control generating circuit FLC and the floating voltage supplying transistor TFL as shown in FIG. 11. As shown in FIG. 11, the floating voltage control generating circuit FLC includes the current source CUS and a control-side transistor circuit. The control-side transistor circuit includes a plurality of diodes as a plurality of control-side transistors TS12 shown in FIG. 11.

The plurality of control-side transistors TS12 are sequentially arranged. A first terminal (such as a drain terminal) of a last one of the plurality of control-side transistors TS12 shown in FIG. 11 is connected to the output node between the second terminal of the high-side switch HS and the first terminal of the low-side switch LS as shown in FIG. 1, and receives the output voltage VOUT from the output node. A second terminal (such as a source terminal) and a control terminal (such as a gain terminal) of a first one of the plurality of control-side transistors TS12 are connected to the output terminal of the current source CUS and the control terminal of the floating voltage supplying transistor TFL. A second terminal (such as a source terminal) and a control terminal (such as a gain terminal) of each of the plurality of control-side transistors TS12, except for the first one of the plurality of control-side transistors TS12, are connected to a first terminal (such as a drain terminal) of a previous one of the plurality of control-side transistors TS12.

Figure 12:
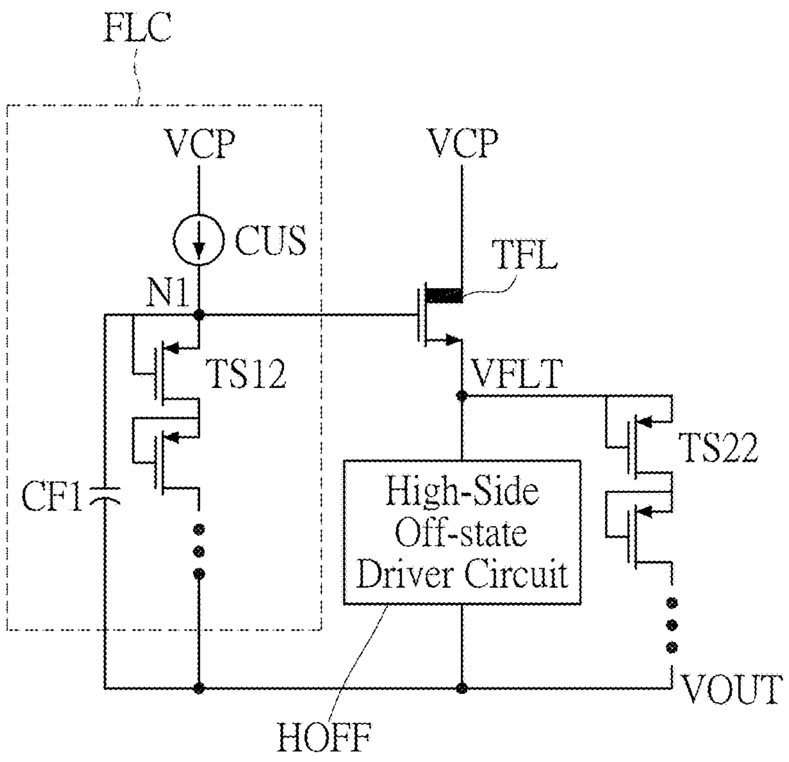
FIG. 12 is a circuit diagram of a high-side voltage difference modulating circuit of a power converter having a voltage difference control mechanism according to a twelfth embodiment of the present disclosure.

Reference is made to FIG. 12 is a circuit diagram of a high-side voltage difference modulating circuit of a power converter having a voltage difference control mechanism according to a twelfth embodiment of the present disclosure.

The high-side voltage difference modulating circuit HVM shown in FIG. 1 may not only include the floating voltage control generating circuit FLC and the floating voltage supplying transistor TFL, but also include a plurality of output-side transistors TS22 shown in FIG. 12.

As shown in FIG. 12, the plurality of output-side transistors TS22 are sequentially arranged. A first terminal (such as a drain terminal) of a last one of the plurality of output-side transistors TS22 is connected to the second power terminal (such as the negative power input terminal) of the high-side off-state driver circuit HOFF. A second terminal (such as a source terminal) and a control terminal (such as a gate terminal) of a first one of the plurality of output-side transistors TS22 are connected to the first power input terminal (such as the positive power input terminal) of the high-side off-state driver circuit HOFF. A second terminal (such as a source terminal) and a control terminal (such as a gate terminal) of each of the plurality of output-side transistors TS22, except for one of the plurality of output-side transistors TS22, are connected to a first terminal (such as a drain terminal) of a previous one of the plurality of output-side transistors TS22.

As shown in FIG. 12, the floating voltage control generating circuit FLC not only includes the current source CUS and the plurality of control-side transistors TS12, but also includes the voltage stabilizing capacitor CF1.

As shown in FIG. 12, the first terminal of the voltage stabilizing capacitor CF1 is connected to the control node N1. The second terminal of the voltage stabilizing capacitor CF1 shown in FIG. 12 is connected to the output node between the second terminal of the high-side switch HS and the first terminal of the low-side switch LS as shown in FIG. 1.

Figure 13:
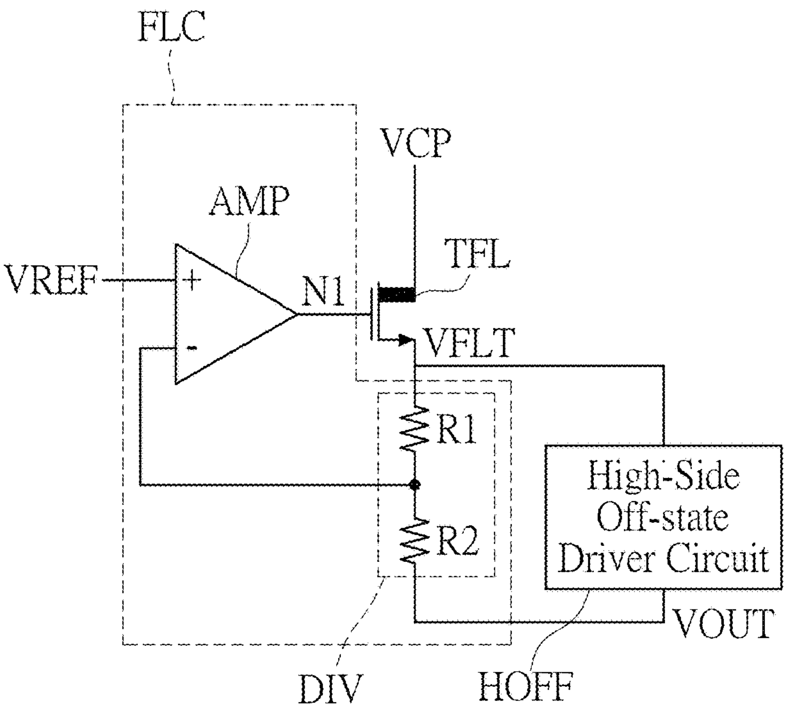
FIG. 13 is a circuit diagram of a high-side voltage difference modulating circuit of a power converter having a voltage difference control mechanism according to a thirteenth embodiment of the present disclosure.

Reference is made to FIG. 13, which is a circuit diagram of a high-side voltage difference modulating circuit of a power converter having a voltage difference control mechanism according to a thirteenth embodiment of the present disclosure.

The high-side voltage difference modulating circuit HVM shown in FIG. 1 may include the floating voltage control generating circuit FLC and the floating voltage supplying transistor TFL as shown in FIG. 13. As shown in FIG. 13, the floating voltage control generating circuit FLC includes an operational amplifier AMP and a voltage divider circuit DIV. The voltage divider circuit DIV includes a first voltage dividing resistor R1 and a second voltage dividing resistor R2.

As shown in FIG. 13, a first terminal of the first voltage dividing resistor R1 is connected to the second terminal of the floating voltage control generating circuit FLC. A second terminal of the first voltage dividing resistor R1 is connected to a first terminal of the second voltage dividing resistor R2. A second terminal of the second voltage dividing resistor R2 shown in FIG. 13 is connected to the output node between the second terminal of the high-side switch HS and the first terminal of the low-side switch LS as shown in FIG. 1. A voltage of the second terminal of the second voltage dividing resistor R2 is equal to the output voltage VOUT of the output node.

A first input terminal such as a non-inverting input terminal of the operational amplifier AMP is coupled to a reference voltage VREF. A second input terminal such as an inverting input terminal of the operational amplifier AMP is connected to a feedback node between the second terminal of the first voltage dividing resistor R1 and the first terminal of the second voltage dividing resistor R2, and receives a feedback voltage of the feedback node. An output terminal of the operational amplifier AMP is connected to the control terminal of the floating voltage supplying transistor TFL.

The operational amplifier AMP multiplies a difference between the feedback voltage of the feedback node between the second terminal of the first voltage dividing resistor R1 and the first terminal of the second voltage dividing resistor R2 by a preset gain to output an operation amplified signal to the control terminal of the floating voltage supplying transistor TFL for controlling the value of the floating voltage VFLT. The floating voltage VFLT is outputted from the second terminal of the floating voltage supplying transistor TFL to the first power input terminal (such as the positive power input terminal) of the high-side off-state driver circuit HOFF.

Figure 14:
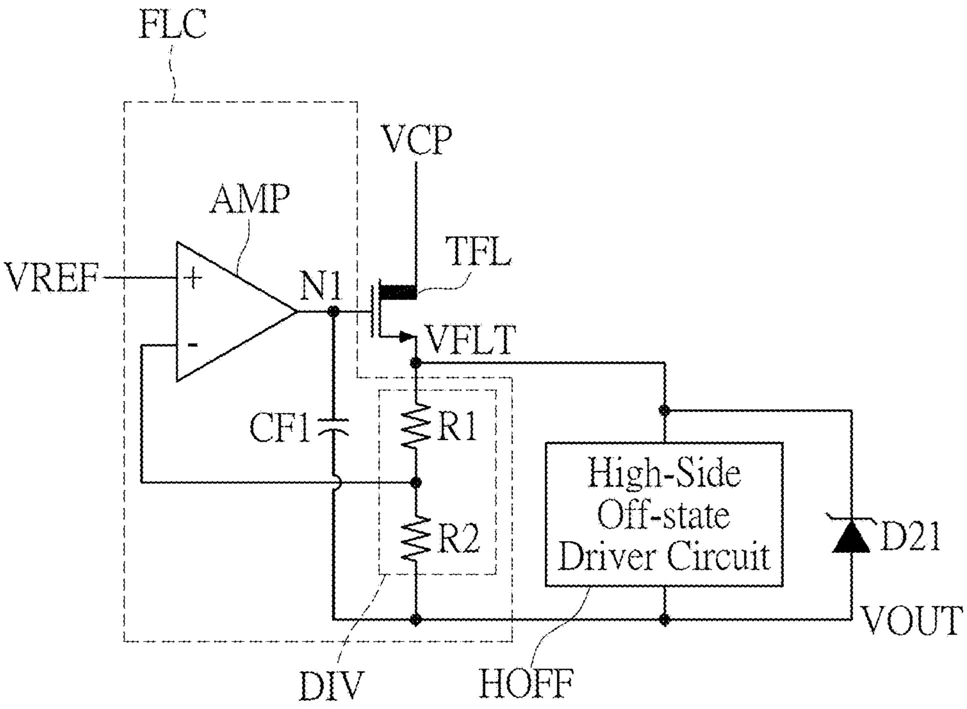
FIG. 14 is a circuit diagram of a high-side voltage difference modulating circuit of a power converter having a voltage difference control mechanism according to a fourteenth embodiment of the present disclosure.

Reference is made to FIG. 14, which is a circuit diagram of a high-side voltage difference modulating circuit of a power converter having a voltage difference control mechanism according to a fourteenth embodiment of the present disclosure.

The high-side voltage difference modulating circuit HVM shown in FIG. 1 may not only include the floating voltage control generating circuit FLC and the floating voltage supplying transistor TFL as shown in FIG. 14, but also include an output-side diode circuit. The output-side diode circuit includes the output-side diode D21 shown in FIG. 14, or in practice, includes a plurality of diodes or one or more transistors as described in the other embodiments. As shown in FIG. 14, the floating voltage control generating circuit FLC not only includes the operational amplifier AMP and the voltage divider circuit DIV, but also includes the voltage stabilizing capacitor CF1.

As shown in FIG. 14, the first terminal of the voltage stabilizing capacitor CF1 is connected to the output terminal of the operational amplifier AMP. The second terminal of the voltage stabilizing capacitor CF1 shown in FIG. 14 is connected to the output node between the second terminal of the high-side switch HS and the first terminal of the low-side switch LS as shown in FIG. 1.

The configurations of the operational amplifier AMP and the voltage divider circuit DIV as shown in FIG. 14 are the same as that shown in FIG. 13, and the configuration of the output-side diode D21 shown in FIG. 14 are the same as that shown in FIG. 4, the same descriptions of which are not repeated herein.

Figure 15:
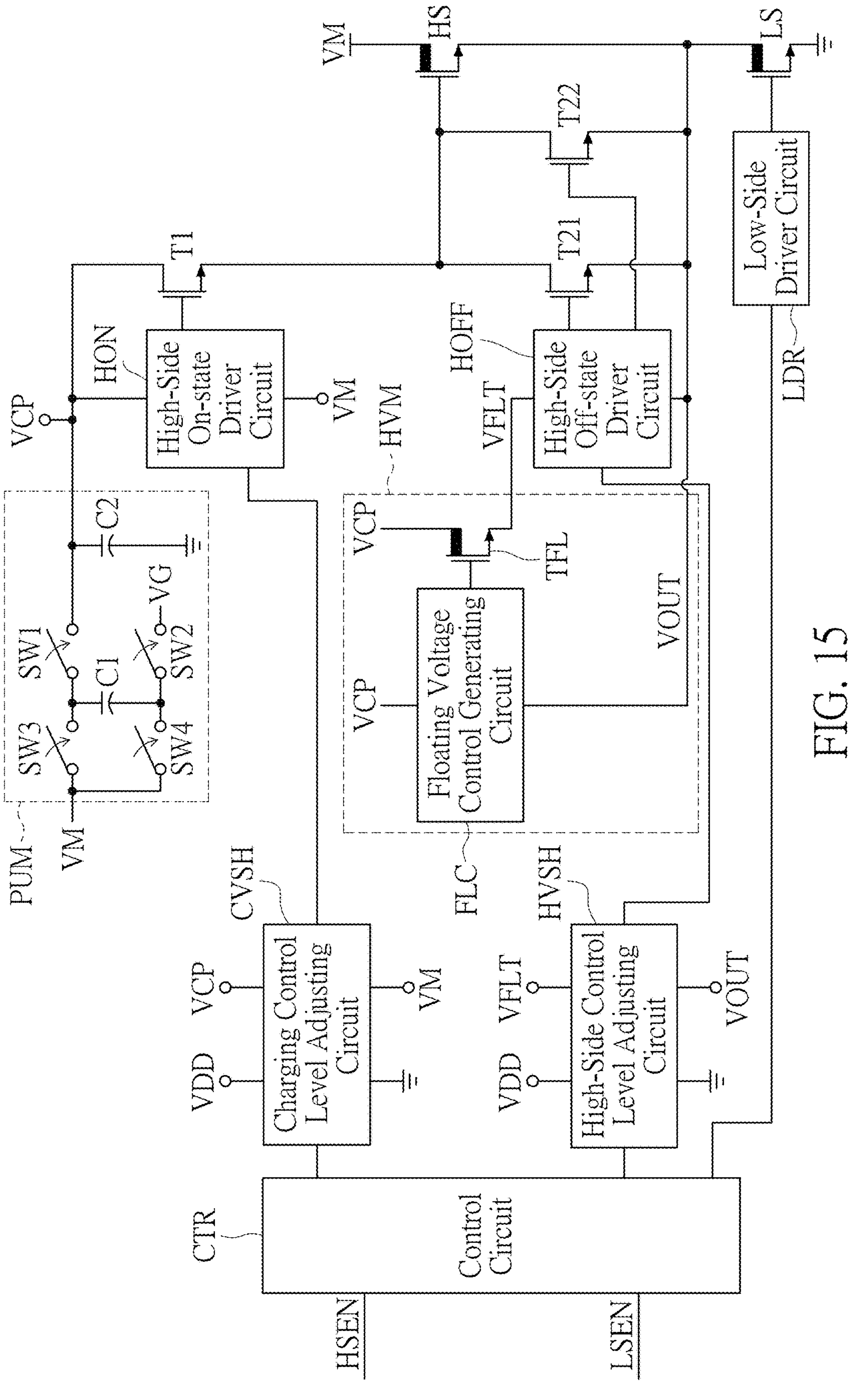
FIG. 15 is a circuit diagram of a power converter having a voltage difference control mechanism according to a fifteenth embodiment of the present disclosure.

Reference is made to FIG. 15, which is a circuit diagram of a power converter having a voltage difference control mechanism according to a fifteenth embodiment of the present disclosure.

The descriptions of the fifteenth embodiment that are the same as the descriptions of the first embodiment are not repeated herein.

As shown in FIG. 15, in fifteenth embodiment, the power converter of the present disclosure not only includes the high-side switch HS, the low-side switch LS, the high-side off-state driver circuit HOFF, the low-side driver circuit LDR, and the high-side voltage difference modulating circuit HVM, but also includes the control circuit CTR, a charging circuit PUM, the high-side control level adjusting circuit HVSH, the charging control level adjusting circuit CVSH, the high-side on-state driver circuit HON, a first transistor T1 and a plurality of second transistors T21, T22, one or more of which may be omitted in practice.

The control circuit CTR outputs a high-side control signal and a charging control signal according to a high-side control enable signal HSEN from an external circuit, and outputs a low-side control signal according to a low-side control enable signal LSEN from the external circuit.

The high-side control level adjusting circuit HVSH is connected between the control circuit CTR and the high-side off-state driver circuit HOFF. The high-side control level adjusting circuit HVSH maintains or modulates the high-side control signal from the control circuit CTR according to the floating voltage VFLT, the output voltage VOUT (and a supply voltage VDD), and then outputs the high-side control signal to a signal input terminal of the high-side off-state driver circuit HOFF. For example, the high-side control level adjusting circuit HVSH includes a voltage level converting circuit as a high-side control level converting circuit configured to convert a voltage level of the high-side control signal.

The high-side off-state driver circuit HOFF may include one or more inverters (that are not shown in figures). If the high-side off-state driver circuit HOFF only includes one inverter, an input terminal of the inverter is connected to an output terminal of the high-side voltage difference modulating circuit HVM and receives a high-side driving signal from the high-side voltage difference modulating circuit HVM. An output terminal of the inverter is connected to a control terminal of each of the plurality of second transistors T21, T22. A first power input terminal (such as a positive power input terminal) of the inverter is used as a first power input terminal (such as the positive power input terminal) of the high-side off-state driver circuit HOFF.

If the high-side off-state driver circuit HOFF includes a plurality of inverters (that are not shown in figures). The plurality of inverters are sequentially arranged. A signal input terminal of one of the plurality of inverters is connected to the output terminal of the high-side voltage difference modulating circuit HVM, and a signal input terminal of another of the plurality of inverters is connected to the control terminal of each of the plurality of second transistors T21, T22. A signal input terminal of each other one of the plurality of inverters is connected to a signal output terminal of a previous one of the plurality of inverters. A first power input terminal (such as a positive power input terminal) of each of the plurality of inverters is used as the first power input terminal (such as the positive power input terminal) of the high-side off-state driver circuit HOFF.

It is worth noting that, the first power input terminal (such as the positive power input terminal) of the one or more inverters included in the high-side off-state driver circuit HOFF are connected to the second terminal of the floating voltage supplying transistor TFL included in the high-side voltage difference modulating circuit HVM, and receives the floating voltage VFLT from the second terminal of the floating voltage supplying transistor TFL.

The charging control level adjusting circuit CVSH is connected between the high-side on-state driver circuit HON and the control circuit CTR. When the charging control level adjusting circuit CVSH receives the high-side control signal from the control circuit CTR, the charging control level adjusting circuit CVSH maintains or modulates the charging control signal from the control circuit CTR according to the charging voltage VCP, the input voltage VM (and the supply voltage VDD), and then outputs the charging control signal to the high-side on-state driver circuit HON. For example, the high-side control level adjusting circuit HVSH includes the voltage level converting circuit as the high-side control level converting circuit configured to convert the voltage level of the high-side control signal.

A signal output terminal of the high-side on-state driver circuit HON is connected to the control terminal of the first transistor T1. A first power input terminal (such as a positive power input terminal) of the high-side on-state driver circuit HON and the first terminal of the first transistor T1 may be connected to the charging circuit PUM, and may receive the charging voltage VCP from the charging circuit PUM. A second power terminal (such as a negative power input terminal) of the high-side on-state driver circuit HON is coupled to the input voltage VM.

The high-side on-state driver circuit HON outputs a charging driving signal to the control terminal of the first transistor T1 for driving the first transistor T1 according to the charging control signal from the charging control level adjusting circuit CVSH.

The charging circuit PUM may include a first charging capacitor C1, a second charging capacitor C2, a first charging switch component SW1, a second charging switch component SW2, a third charging switch component SW3 and a fourth charging switch component SW4.

The high-side on-state driver circuit HON may be connected to a first terminal of the first charging switch component SW1 and a first terminal of the second charging capacitor C2. A second terminal of the second charging capacitor C2 is grounded. A second terminal of the first charging switch component SW1 is connected to a first terminal of the first charging capacitor C1. A second terminal of the first charging capacitor C1 is connected to a first terminal of the second charging switch component SW2. A second terminal of the second charging switch component SW2 is coupled to a modulation voltage VG. For example, the modulation voltage VG may be equal to the input voltage VM from which a preset voltage (such as 5V).

A first terminal of the third charging switch component SW3 is connected to the second terminal of the first charging switch component SW1 and the first terminal of the first charging capacitor C1. A first terminal of the fourth charging switch component SW4 is connected to the second terminal of the first charging capacitor C1 and the first terminal of the second charging switch component SW2. A second terminal of the third charging switch component SW3 and a second terminal of the fourth charging switch component SW are coupled to the input voltage VM.

The charging circuit PUM is configured to supplies the charging voltage VCP to the first power input terminal (such as the positive power input terminal) of the high-side on-state driver circuit HON, the first terminal of the first transistor T1, the charging control level adjusting circuit CVSH, the first terminal of the floating voltage supplying transistor TFL and the first terminal of the floating voltage control generating circuit FLC for pulling up a voltage of the control terminal of the high-side switch HS.

The charging circuit PUM supplies the charging voltage VCP to the first terminal of the first transistor T1. When the high-side switch HS is switched from the off-state to the on-state, the high-side on-state driver circuit HON turns on the first transistor T1, the charging voltage VCP is supplied to the control terminal of the high-side switch HS through the first transistor T1 to pull up the voltage of the control terminal of the high-side switch HS to be equal to or be approximately equal to the charging voltage VCP. At the same time, the high-side off-state driver circuit HOFF turns off the plurality of second transistors T21, T22. For example, the charging voltage VCP is equal to a sum of the input voltage VM and the preset voltage (such as 5V).

It is worth noting that, when the high-side switch HS is switched from the on-state to the off-state, the high-side on-state driver circuit HON turns off the first transistor T1 such that the charging voltage VCP outputted by the charging circuit PUM is stopped to be supplied to the control terminal of the high-side switch HS. At the same time, the high-side voltage difference modulating circuit HVM, according to the output voltage VOUT of the output node between the second terminal of the high-side switch HS and the first terminal of the low-side switch LS, modulates the floating voltage VFLT of the first power input terminal (such as the positive power input terminal) of the high-side off-state driver circuit HOFF. The high-side off-state driver circuit HOFF uses the floating voltage VFLT from the high-side voltage difference modulating circuit HVM to control the plurality of second transistors T21, T22.

For example, the high-side off-state driver circuit HOFF may turn on all or at least one of the plurality of second transistors T21, T22 for pulling the voltage of the control terminal of the high-side switch HS to be equal to the output voltage VOUT of the output node between the second terminal of the high-side switch HS and the first terminal of the low-side switch LS. As a result, the voltage difference between the voltage of the control terminal (such as the gate terminal) and the second terminal (such as the source terminal) of the high-side switch HS is 0V, which is represented by VGS=0, wherein VGS represents the voltage difference.

In conclusion, the present disclosure provides the power converter having the voltage difference control mechanism. In comparison with the conventional power converter including the voltage level adjusting circuit occupying a large area therein, the power converter of the present disclosure includes the high-side voltage difference modulating circuit. Even if the voltage level adjusting circuit is omitted in the power converter of the present disclosure, the high-side voltage difference modulating circuit of the power converter of the present disclosure modulates the floating voltage of the positive power input terminal of the high-side off-state driver circuit for precise control of the high-side switch. Therefore, size and power consumption of the power converter of the present disclosure are smaller than that of the conventional power converter.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter having a voltage difference control mechanism, comprising:

a high-side switch, wherein a first terminal of the high-side switch is coupled to an input voltage;

a low-side switch, wherein a first terminal of the low-side switch is connected to a second terminal of the high-side switch, and a second terminal of the low-side switch is grounded;

a low-side driver circuit connected to a control terminal of the low-side switch and configured to drive the low-side switch;

a high-side on-state driver circuit configured to switch the high-side switch from an off-state to an on-state;

a high-side off-state driver circuit, wherein a signal output terminal of the high-side off-state driver circuit is connected to a control terminal of the high-side switch; and a high-side voltage difference modulating circuit connected to a first power input terminal of the high-side off-state driver circuit, and connected to an output node between the first terminal of the low-side switch and the second terminal of the high-side switch;

wherein the high-side voltage difference modulating circuit is configured to output a floating voltage to the first power input terminal of the high-side off-state driver circuit according to an output voltage of the output node;

wherein the high-side off-state driver circuit is configured to use the floating voltage to switch the high-side switch from an on-state to an off-state such that a voltage difference between the floating voltage and the output voltage falls within a target voltage range.

2. The power converter according to claim 1, wherein the high-side voltage difference modulating circuit is configured to modulate the floating voltage such that the voltage difference between the floating voltage and the output voltage is maintained to be equal to a target voltage value.

3. The power converter according to claim 1, wherein the high-side voltage difference modulating circuit includes:

a floating voltage supplying transistor, wherein a first terminal of the floating voltage supplying transistor is coupled to a charging voltage, and a second terminal of the floating voltage supplying transistor is connected to the first power input terminal of the high-side off-state driver circuit; and a floating voltage control generating circuit connected to a control terminal of the floating voltage supplying transistor and the output node, and configured to output a floating control voltage signal to the control terminal of the floating voltage supplying transistor according to the output voltage.

4. The power converter according to claim 3, wherein the floating voltage control generating circuit further includes:

a current source; and a control-side diode circuit, wherein the control-side diode circuit includes a plurality of control-side diode that are sequentially arranged and connected with each other in series or only includes one of the plurality of control-side diodes, and the control-side diode circuit is connected to the current source and connected between the control terminal of the floating voltage supplying transistor and the output node.

5. The power converter according to claim 4, wherein the floating voltage control generating circuit further includes:

a voltage stabilizing capacitor, wherein a first terminal of the voltage stabilizing capacitor is connected to the current source and the control terminal of the floating voltage supplying transistor, and a second terminal of the voltage stabilizing capacitor is connected to the output node.

6. The power converter according to claim 3, wherein the floating voltage control generating circuit further includes:

a current source; and a plurality of control-side transistors, wherein the plurality of control-side transistors are sequentially arranged, a first terminal and a control terminal of a first one of the plurality of control-side transistors are connected to the current source and the control terminal of the floating voltage supplying transistor, a first terminal and a control terminal of each of the plurality of control-side transistors except for the first one of the plurality of control-side transistor are connected to a second terminal of a previous one of the plurality of control-side transistors, and a second terminal of a last one of the plurality of control-side transistors is connected to the output node.

7. The power converter according to claim 6, wherein the floating voltage control generating circuit further includes:

a voltage stabilizing capacitor, wherein a first terminal of the voltage stabilizing capacitor is connected to the current source and the control terminal of the floating voltage supplying transistor, and a second terminal of the voltage stabilizing capacitor is connected to the output node.

8. The power converter according to claim 3, wherein the floating voltage control generating circuit further includes:

a current source; and a plurality of control-side transistors, wherein the plurality of control-side transistors are sequentially arranged, a second terminal of a last one of the plurality of control-side transistors is connected to the output node, a second terminal and a control terminal of a first one of the plurality of control-side transistors are connected to the current source and the control terminal of the floating voltage supplying transistor, and a second terminal and a control terminal of each of the plurality of control-side transistors except for the first one of the plurality of control-side transistor are connected to a first terminal of a previous one of the plurality of control-side transistors.

9. The power converter according to claim 8, wherein the floating voltage control generating circuit further includes:

a voltage stabilizing capacitor, wherein a first terminal of the voltage stabilizing capacitor is connected to the current source and the control terminal of the floating voltage supplying transistor, and a second terminal of the voltage stabilizing capacitor is connected to the output node.

10. The power converter according to claim 3, wherein the floating voltage control generating circuit further includes:

an operational amplifier, wherein a first input terminal of the operational amplifier is coupled to a reference voltage, and an output terminal of the operational amplifier is connected to the control terminal of the floating voltage supplying transistor; and a voltage divider circuit including a first voltage dividing resistor and a second voltage dividing resistor, a first terminal of the first voltage dividing resistor is connected to a second terminal of the floating voltage supplying transistor, a second terminal of the first voltage dividing resistor is connected to a first terminal of the second voltage dividing resistor, a second terminal of the second voltage dividing resistor is connected to the output node, and a feedback node between the second terminal of the first voltage dividing resistor and the first terminal of the second voltage dividing resistor is connected to a second input terminal of the operational amplifier.

11. The power converter according to claim 10, wherein the floating voltage control generating circuit further includes:

a voltage stabilizing capacitor, wherein a first terminal of the stabilizing capacitor is connected to the output terminal of the operational amplifier, and a second terminal of the voltage stabilizing capacitor is connected to the output node.

12. The power converter according to claim 3, wherein the high-side voltage difference modulating circuit further includes:

an output-side diode circuit, wherein the output-side diode circuit includes a plurality of output-side diodes that are sequentially arranged and connected with each other in series or only includes one of the plurality of output-side diodes, and the output-side diode circuit is connected between the second terminal of the floating voltage supplying transistor and a second power input terminal of the high-side off-state driver circuit.

13. The power converter according to claim 3, wherein the high-side voltage difference modulating circuit further includes:

a plurality of output-side transistors that are sequentially arranged and connected with each other in series, wherein a first terminal and a control terminal of a first one of the plurality of output-side transistors are connected to the second terminal of the floating voltage supplying transistor, a first terminal and a control terminal of each of the plurality of output-side transistors except for the first one of the plurality of output-side transistors are connected to a second terminal of a previous one of the plurality of output-side transistors, and a second terminal of a last one of the plurality of output-side transistors is connected to a second power input terminal of the high-side off-state driver circuit.

14. The power converter according to claim 3, wherein the high-side voltage difference modulating circuit further includes:

a plurality of output-side transistors that are sequentially arranged and connected with each other in series, wherein a first terminal of a last one of the plurality of output-side transistors is connected to a second power input terminal of the high-side off-state driver circuit, a second terminal and a control terminal of a first one of the plurality of output-side transistors are connected to the second terminal of the floating voltage supplying transistor, and a second terminal and a control terminal of each of the plurality of output-side transistors except for the first one of the plurality of output-side transistors are connected to a first terminal of a previous one of the plurality of output-side transistors.

15. The power converter according to claim 3, wherein the high-side voltage difference modulating circuit further includes:

an output-side transistor, wherein a first terminal of the output-side transistor is connected to the second terminal of the floating voltage supplying transistor, a second terminal of the output-side transistor is connected to a second power input terminal of the high-side off-state driver circuit, and a control terminal of the output-side transistor is coupled to a control voltage.

16. The power converter according to claim 3, wherein the high-side voltage difference modulating circuit further includes:

an output-side transistor, wherein a first terminal of the output-side transistor is connected to the second terminal of the floating voltage supplying transistor, a second terminal of the output-side transistor is connected to a second power input terminal of the high-side off-state driver circuit, and a control terminal off the output-side transistor is connected to the control terminal of the floating voltage supplying transistor.

17. The power converter according to claim 1, further comprising:

a first transistor, wherein a first terminal of the first transistor is coupled to a charging voltage, a second terminal of the first transistor is connected to the control terminal of the high-side switch, and a signal output terminal of the high-side on-state driver circuit is connected to a control terminal of the first transistor.

18. The power converter according to claim 17, further comprising:

a charging circuit connected to the high-side on-state driver circuit and the first terminal of the first transistor, and configured to supply the charging voltage to the high-side on-state driver circuit and the first terminal of the first transistor.

19. The power converter according to claim 17, further comprising:

a control circuit connected to a signal input terminal of the high-side on-state driver circuit, a signal input terminal of the low-side driver circuit and a signal input terminal of the high-side on-state driver circuit, and configured to control the high-side off-state driver circuit, the low-side driver circuit and the high-side on-state driver circuit.

20. The power converter according to claim 17, further comprising:

one or more second transistors, wherein control terminals of the one or more second transistors are connected to the signal output terminal of the high-side off-state driver circuit, first terminals of the one or more second transistors are connected to the second terminal of the first transistor and the control terminal of the high-side switch, and second terminals of the one or more second transistors are connected to the output node.

* * * * *